United States Patent
Yang et al.

(10) Patent No.: US 11,494,511 B2
(45) Date of Patent: Nov. 8, 2022

(54) DATA PROCESSING METHODS, APPARATUSES, AND DEVICES

(71) Applicant: ALIPAY (HANGZHOU) INFORMATION TECHNOLOGY CO., LTD., Zhejiang (CN)

(72) Inventors: Wenyu Yang, Hangzhou (CN); Shubo Li, Hangzhou (CN); Yuan Chen, Hangzhou (CN); Sheng Zhang, Hangzhou (CN); Renhui Yang, Hangzhou (CN); Qin Liu, Hangzhou (CN); Qin Xiong, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/364,658

(22) Filed: Jun. 30, 2021

(65) Prior Publication Data

US 2021/0326469 A1    Oct. 21, 2021

(30) Foreign Application Priority Data

Sep. 15, 2020 (CN) .......................... 202010967008.0

(51) Int. Cl.
*G06F 21/62* (2013.01)
*H04L 9/32* (2006.01)
*H04L 9/00* (2022.01)

(52) U.S. Cl.
CPC ........ *G06F 21/6218* (2013.01); *H04L 9/3239* (2013.01); *H04L 9/50* (2022.05)

(58) Field of Classification Search
CPC ...... G06F 21/6218; G06F 21/62; G06F 16/27; H04L 9/3239; H04L 9/50

(Continued)

(56) References Cited

U.S. PATENT DOCUMENTS 6,978,366 B1 *  12/2005  Ignatchenko ....... G06F 21/6218
                                                  713/165
8,458,085 B1 *   6/2013  Yakubov ................ G06Q 40/00
                                                  705/36 R (Continued)

FOREIGN PATENT DOCUMENTS

AU    2014274590 A1 *  1/2015  ......... G06F 21/6218
CN       1996955        7/2007

(Continued)

OTHER PUBLICATIONS

Wang, Rong, Wei-Tek Tsai, Juan He, Can Liu, Qi Li, and Enyan Deng. "A medical data sharing platform based on permissioned blockchains." In Proceedings of the 2018 International Conference on Blockchain Technology and Application, pp. 12-16. 2018. (Year: 2018).*

(Continued)

*Primary Examiner* — Luu T Pham
*Assistant Examiner* — Walter J Malinowski
(74) *Attorney, Agent, or Firm* — Fish & Richardson P.C.

(57) ABSTRACT

Embodiments of the present specification disclose data processing methods, apparatuses, and devices. A method can include: obtaining data use authorization information sent by a data requester; verifying the data use authorization information; in response to successfully verifying the data use authorization information, sending data authorized to be accessed by the data use authorization information to the data requester, wherein the data is obtained from a trusted institution and is stored in trusted hardware; and storing, on a blockchain associated with a blockchain network, a data sending record for the data.

19 Claims, 4 Drawing Sheets

(58) Field of Classification Search
USPC .................................................. 726/27
See application file for complete search history.

(56) References Cited

U.S. PATENT DOCUMENTS

| | | | |
|---|---|---|---|
| 10,505,741 B1 | 12/2019 | Conley | |
| 10,783,597 B1* | 9/2020 | Li | G06Q 50/18 |
| 10,949,560 B1* | 3/2021 | Delaney | G06F 21/604 |
| 11,146,564 B1* | 10/2021 | Ankam | H04L 63/0876 |
| 2003/0105855 A1* | 6/2003 | Wynnyk | H04L 12/14 |
| | | | 709/224 |
| 2004/0064445 A1* | 4/2004 | Pfleging | H04W 4/20 |
| 2004/0267890 A1* | 12/2004 | Soulet | H04L 51/00 |
| | | | 709/206 |
| 2006/0095415 A1* | 5/2006 | Sattler | G06F 16/242 |
| 2006/0248349 A1* | 11/2006 | Rathjen | G16B 50/30 |
| | | | 713/186 |
| 2007/0220009 A1* | 9/2007 | Morris | G06F 21/6218 |
| 2008/0163347 A1* | 7/2008 | Ratcliff | G06F 21/6227 |
| | | | 726/6 |
| 2010/0229245 A1* | 9/2010 | Singhal | G06Q 20/32 |
| | | | 235/382 |
| 2011/0145565 A1* | 6/2011 | Kol | H04L 9/3271 |
| | | | 713/155 |
| 2011/0173122 A1* | 7/2011 | Singhal | G06Q 20/4037 |
| | | | 705/44 |
| 2011/0246587 A1* | 10/2011 | Marl | H04L 69/329 |
| | | | 709/206 |
| 2012/0134548 A1* | 5/2012 | Rhoads | G06Q 20/3276 |
| | | | 398/115 |
| 2012/0185781 A1* | 7/2012 | Guzman | G06F 3/0482 |
| | | | 715/752 |
| 2013/0262514 A1* | 10/2013 | Everett | G06F 21/6245 |
| | | | 707/781 |
| 2015/0379303 A1* | 12/2015 | LaFever | G06F 21/6254 |
| | | | 726/28 |
| 2016/0306995 A1* | 10/2016 | Arasu | G06F 21/6218 |
| 2016/0359844 A1* | 12/2016 | Saboori | H04L 9/30 |
| 2017/0339287 A1* | 11/2017 | Ma | G06V 40/172 |
| 2017/0352122 A1* | 12/2017 | Markarian | A47G 29/1201 |
| 2018/0068091 A1* | 3/2018 | Gaidar | G06F 21/16 |
| 2018/0183586 A1* | 6/2018 | Bhargav-Spantzel | |
| | | | G06F 21/33 |
| 2018/0254898 A1 | 9/2018 | Sprague et al. | |
| 2019/0005145 A1* | 1/2019 | Kleinberg | G06F 16/93 |
| 2019/0103967 A1* | 4/2019 | Meng | G06F 21/62 |
| 2019/0279206 A1* | 9/2019 | Song | G06F 16/1834 |
| 2020/0076816 A1* | 3/2020 | Turgeman | H04L 67/28 |
| 2021/0049716 A1* | 2/2021 | Li | G06F 21/725 |
| 2021/0133318 A1* | 5/2021 | Andrews | G06F 21/577 |
| 2021/0152363 A1* | 5/2021 | Li | G06F 16/27 |
| 2021/0157938 A1* | 5/2021 | Chen | H04L 9/3236 |
| 2021/0294798 A1* | 9/2021 | Binkley | G06F 16/9024 |
| 2021/0312073 A1* | 10/2021 | Yang | G06F 21/64 |
| 2021/0312089 A1* | 10/2021 | Liu | G06F 21/78 |
| 2021/0326476 A1* | 10/2021 | Su | H04L 9/50 |
| 2021/0326477 A1* | 10/2021 | Liu | H04L 63/10 |
| 2021/0326485 A1* | 10/2021 | Yang | H04L 9/008 |
| 2021/0328780 A1* | 10/2021 | Yang | H04L 9/3247 |
| 2021/0329067 A1* | 10/2021 | Yang | H04L 67/1065 |
| 2021/0397688 A1* | 12/2021 | Yang | H04L 63/0876 |
| 2022/0075902 A1* | 3/2022 | Chen | G06F 21/6245 |

FOREIGN PATENT DOCUMENTS

| | | | | |
|---|---|---|---|---|
| CN | 101729533 A | * | 6/2010 | |
| CN | 102063942 A | * | 5/2011 | |
| CN | 201854292 U | * | 6/2011 | |
| CN | 103677935 | | 3/2014 | |
| CN | 103942678 A | * | 7/2014 | G06Q 20/20 |
| CN | 104010044 | | 8/2014 | |
| CN | 105260164 A | * | 1/2016 | |
| CN | 102811335 B | * | 2/2016 | |
| CN | 105631322 | | 6/2016 | |
| CN | 106254560 A | * | 12/2016 | |
| CN | 106408486 | | 2/2017 | |
| CN | 106961653 A | * | 7/2017 | H04L 1/0006 |
| CN | 107507091 | | 12/2017 | |
| CN | 107579979 | | 1/2018 | |
| CN | 107622385 | | 1/2018 | |
| CN | 107729745 | | 2/2018 | |
| CN | 107742189 | | 2/2018 | |
| CN | 207120573 U | * | 3/2018 | |
| CN | 107968709 | | 4/2018 | |
| CN | 207216621 U | * | 4/2018 | |
| CN | 108076011 | | 5/2018 | |
| CN | 108282480 A | * | 7/2018 | |
| CN | 108471350 | | 8/2018 | |
| CN | 108616539 | | 10/2018 | |
| CN | 108632284 | | 10/2018 | |
| CN | 108717861 A | * | 10/2018 | G16H 10/60 |
| CN | 108734580 A | * | 11/2018 | |
| CN | 108881160 | | 11/2018 | |
| CN | 108932297 | | 12/2018 | |
| CN | 108985089 | | 12/2018 | |
| CN | 108985089 A | * | 12/2018 | |
| CN | 109150607 | | 1/2019 | |
| CN | 109245893 | | 1/2019 | |
| CN | 109376504 | | 2/2019 | |
| CN | 109522722 | | 3/2019 | |
| CN | 109525400 | | 3/2019 | |
| CN | 109547500 | | 3/2019 | |
| CN | 109660358 | | 4/2019 | |
| CN | 109710270 | | 5/2019 | |
| CN | 109741039 | | 5/2019 | |
| CN | 109768865 | | 5/2019 | |
| CN | 109840436 | | 6/2019 | |
| CN | 109993490 | | 7/2019 | |
| CN | 110009232 | | 7/2019 | |
| CN | 110034924 | | 7/2019 | |
| CN | 110046165 | | 7/2019 | |
| CN | 110083610 | | 8/2019 | |
| CN | 110086804 | | 8/2019 | |
| CN | 110222518 A | * | 9/2019 | |
| CN | 110222533 | | 9/2019 | |
| CN | 110224837 | | 9/2019 | |
| CN | 110335149 | | 10/2019 | |
| CN | 110457875 | | 11/2019 | |
| CN | 110516178 | | 11/2019 | |
| CN | 11063 6062 | | 12/2019 | |
| CN | 110555292 | | 12/2019 | |
| CN | 110737905 A | * | 1/2020 | G06F 21/602 |
| CN | 110781192 A | * | 2/2020 | G06F 16/2228 |
| CN | 110837658 | | 2/2020 | |
| CN | 110958276 A | * | 4/2020 | |
| CN | 110968743 | | 4/2020 | |
| CN | 110990804 | | 4/2020 | |
| CN | 111049660 | | 4/2020 | |
| CN | 111179067 | | 5/2020 | |
| CN | 111191268 | | 5/2020 | |
| CN | 111222157 | | 6/2020 | |
| CN | 111340627 | | 6/2020 | |
| CN | 108717861 B | * | 7/2020 | |
| CN | 111414599 | | 7/2020 | |
| CN | 111415157 | | 7/2020 | |
| CN | 108985089 B | * | 8/2020 | |
| CN | 111506662 | | 8/2020 | |
| CN | 111597565 | | 8/2020 | |
| CN | 106254560 B | * | 9/2020 | |
| CN | 111741036 | | 10/2020 | |
| CN | 111767527 A | * | 10/2020 | |
| JP | 2011216941 A | * | 10/2011 | |
| KR | 20210056866 A | * | 5/2021 | |
| WO | WO-02073392 A1 | * | 9/2002 | H04L 63/101 |
| WO | WO-2012114233 A2 | * | 8/2012 | H04K 3/43 |
| WO | WO 2019214211 | | 11/2019 | |
| WO | WO-2019214211 A1 | * | 11/2019 | G06F 21/62 |
| WO | WO-2019227449 A1 | * | 12/2019 | G06Q 20/12 |
| WO | WO-2020017406 A1 | * | 1/2020 | G06Q 50/10 |

(56) References Cited

FOREIGN PATENT DOCUMENTS

| WO | WO 2019179535 | 5/2020 | | |
|---|---|---|---|---|
| WO | WO-2021112831 A1 | * | 6/2021 | ............ H04L 9/0894 |

OTHER PUBLICATIONS

Uchibayashi. "Proposed data audit system enhances use in accordance with the data owner's policy." In 2016 11th International Conference on Knowledge, Information and Creativity Support Systems (KICSS), pp. 1-5. IEEE, 2016. (Year: 2016).*

Cao, Jiabao, Lijuan Wang, Jinfeng Dou, Lei Chu, and Changrui Qu. "Objective Function Optimization Based Time-competition Forwarding Strategy in Internet of Marine Things." In Proceedings of the 2020 6th International Conference on Computing and Artificial Intelligence, pp. 468-475. 2020. (Year: 2020).*

Li, Haiting, Houzhi Wang, Zhiqiang Jing, and Zhimin Yang. "The Study for Data Security Mechanism in WebGIS Based on Tile Caches." In 2009 International Conference on Management and Service Science, pp. 1-4. IEEE, 2009. (Year: 2009).*

Lee, Ruby B. "Rethinking computers for cybersecurity." Computer 48, No. 4 (2015): 16-25. (Year: 2015).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

U.S. Appl. No. 17/348,975, Yang et al., filed Jun. 16, 2021.
U.S. Appl. No. 17/349,764, Liu et al., filed Jun. 16, 2021.
U.S. Appl. No. 17/358,249, Li et al., filed Jun. 25, 2021.
U.S. Appl. No. 17/359,069, Chen et al., filed Jun. 25, 2021.
U.S. Appl. No. 17/359,219, Chen et al., filed Jun. 25, 2021.
U.S. Appl. No. 17/359,475, Yang et al., filed Jun. 25, 2021.
U.S. Appl. No. 17/359,476, Yang et al., filed Jun. 25, 2021.
U.S. Appl. No. 17/359,487, Yang et al., filed Jun. 25, 2021.
U.S. Appl. No. 17/362,914, Liu et al., filed Jun. 29, 2021.
U.S. Appl. No. 17/364,602, Yang et al., filed Jun. 30, 2021.
Extended European Search Report in European Application No. 21181357.1, dated Dec. 2, 2021, 8 pages.

* cited by examiner

DATA PROCESSING METHODS, APPARATUSES, AND DEVICES

CROSS-REFERENCE TO RELATED APPLICATIONS

This application claims priority to Chinese Patent Application No. 202010967008.0, filed on Sep. 15, 2020, which is hereby incorporated by reference in its entirety.

TECHNICAL FIELD

The present application relates to the field of Internet technologies, and in particular, to data processing methods, apparatuses, and devices.

BACKGROUND

In daily life, when users handle various services, various kinds of data needed for handling the services usually need to be presented, and the trustworthiness of data presented by the users is verified by the users. As such, service providers can provide corresponding services to the users based on the data presented by the users. Currently, the users often need to print needed data from authority agencies, and the data needs to be sealed with official seals of the authorities, thereby ensuring the trustworthiness of the data presented to the service providers.

Therefore, how to provide a more convenient way for presenting trusted data becomes an urgent problem to be resolved.

SUMMARY

Embodiments of the present specification provide data processing methods, apparatuses, and devices so as to improve operation convenience when users use trusted data.

To resolve the previously described technical problem, the embodiments of the present description provide the following solutions:

Some embodiments of the present specification provide a data processing method, including the following: data use authorization information sent by a data requester is obtained; the data use authorization information is verified; data authorized to be accessed by the data use authorization information is sent to the data requester if the verification is successful, the data is stored in trusted hardware, and the data is data obtained from a trusted institution; and a data sending record for the data is stored in a blockchain network.

Some embodiments of the present specification provide a data processing apparatus, including the following: a first acquisition module, configured to obtain data use authorization information sent by a data requester; a verification module, configured to verify the data use authorization information; a first sending module, configured to send data authorized to be accessed by the data use authorization information to the data requester if the verification is successful, the data being stored in trusted hardware, and the data being data obtained from a trusted institution; and a second sending module, configured to store a data sending record for the data in a blockchain network.

Some embodiments of the present specification provide a data processing device, including: at least one processor; and a memory communicatively connected to the at least one processor, where the memory stores instructions executable by the at least one processor, and the instructions are executed by the at least one processor such that the at least one processor can: obtain data use authorization information sent by a data requester; verify the data use authorization information; send data authorized to be accessed by the data use authorization information to the data requester if the verification is successful, the data being stored in trusted hardware, and the data being data obtained from a trusted institution; and store a data sending record for the data in a blockchain network.

At least one embodiment of the present specification can achieve the following beneficial effects:

After data use authorization information sent by a data requester is verified successfully, trusted data stored in trusted hardware and obtained from a trusted institution is sent to the data requester so that a data owner can conveniently provide data with high trustworthiness to the data requester, and the data owner can conveniently implement use authorization management and control of the trusted data. The solution can further store a data sending record for data of the data owner in a blockchain network so as to facilitate subsequent analysis on a data authorized use condition of the data owner.

BRIEF DESCRIPTION OF DRAWINGS

To describe the technical solutions in the embodiments of the present specification or in the existing technologies more clearly, the following briefly describes accompanying drawings needed for describing the embodiments or the existing technologies. Clearly, the accompanying drawings in the following description show merely some embodiments of the present application, and a person of ordinary skill in the art can still derive other accompanying drawings from these accompanying drawings without making innovative efforts.

DESCRIPTION OF EMBODIMENTS

To make purposes, technical solutions and advantages of one or more embodiments of the present specification more clear, the following clearly and fully describes the technical solutions in the one or more embodiments of the present specification with reference to the embodiments of the present specification and corresponding accompanying drawings. Obviously, the described embodiments are merely some but not all of the embodiments of the present specification. Based on the embodiments of the present specification, all other embodiments derived by a person of ordinary skill in the art without making innovative efforts shall fall within the protection scope of the one or more embodiments of the present specification.

The following describes in detail the technical solutions provided in the embodiments of the present specification with reference to the accompanying drawings.

In the existing technology, when a user handles a service, a service provider usually needs the user to provide trusted data needed for handling the service. The user usually needs to go to authority agency to obtain the data from an authority agency, and the data needs to be sealed with an official seal of the authority agency so as to ensure trustworthiness of the data presented to the service provider by the user. In addition, if the user needs to use the trusted data for many times, the user may further needs to repeatedly request the authority agency for the data sealed with the official seal. Such a method for using the trusted data has a relatively complicated operation and brings inconvenience to the user. Moreover, it is not helpful for the user to trace back and audit a use process of the trusted data.

Figure 1:
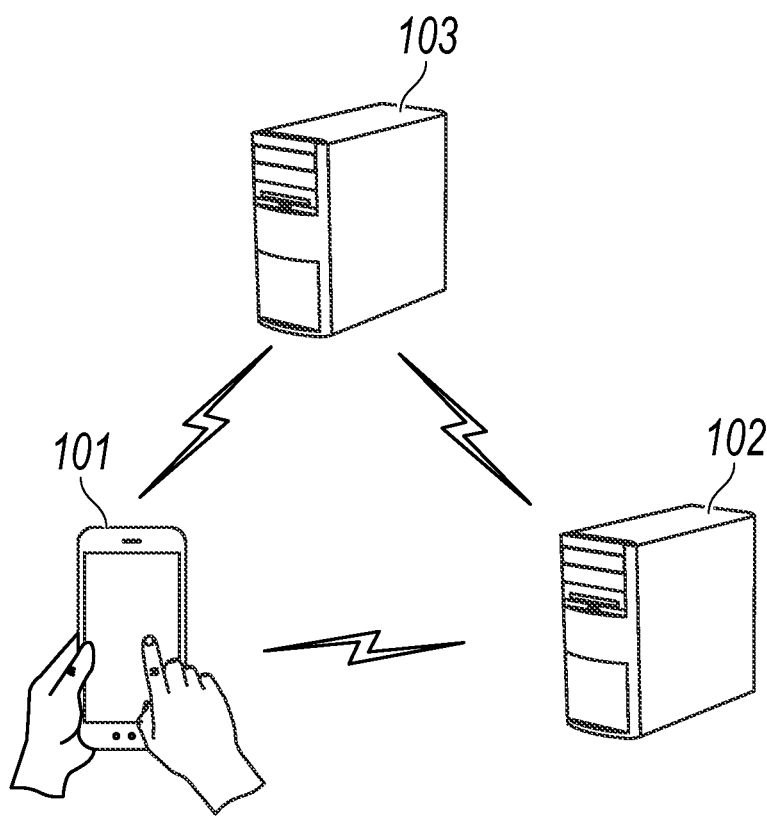
FIG. 1 is a schematic flowchart illustrating an overall solution of a data processing method, according to some embodiments of the present specification.

To resolve defects in the existing technology, the present solution provides the following embodiments:

FIG. 1 is a schematic flowchart illustrating an overall solution of a data processing method, according to some embodiments of the present specification. As shown in FIG. 1, a data owner can use a target application carried in a device 101 to store data obtained from a trusted institution in trusted hardware so as to manage and control a use condition of the data stored in the trusted hardware by using the target application. The data owner can further send data use authorization information to a device 102 of a data requester through the device 101 so that the data requester can send the received data use authorization information to the device 101 carrying the target application or a server 103 of the target application through the device 102 to request for data.

After successfully verifying the data use authorization information sent by the device 102, the device 101 carrying the target application or the server 103 of the target application can extract data authorized to be accessed by the data use authorization information from the trusted hardware, and feed back the extracted data to the device 102 of the data requester. Because the data stored in the trusted hardware is obtained from the trusted institution and the data in the trusted hardware cannot be tampered with, high trustworthiness of the data fed back to the device 102 of the data requester can be ensured.

According to the present solution, the data owner can conveniently manage the trusted data by using the target application, thereby improving user experience. Moreover, the device 101 carrying the target application or the server 103 of the target application can further store a data sending record for the data in the trusted hardware to a blockchain network so as to provide real trusted data for subsequent analysis of the use condition of the data in the trusted hardware.

Figure 2:
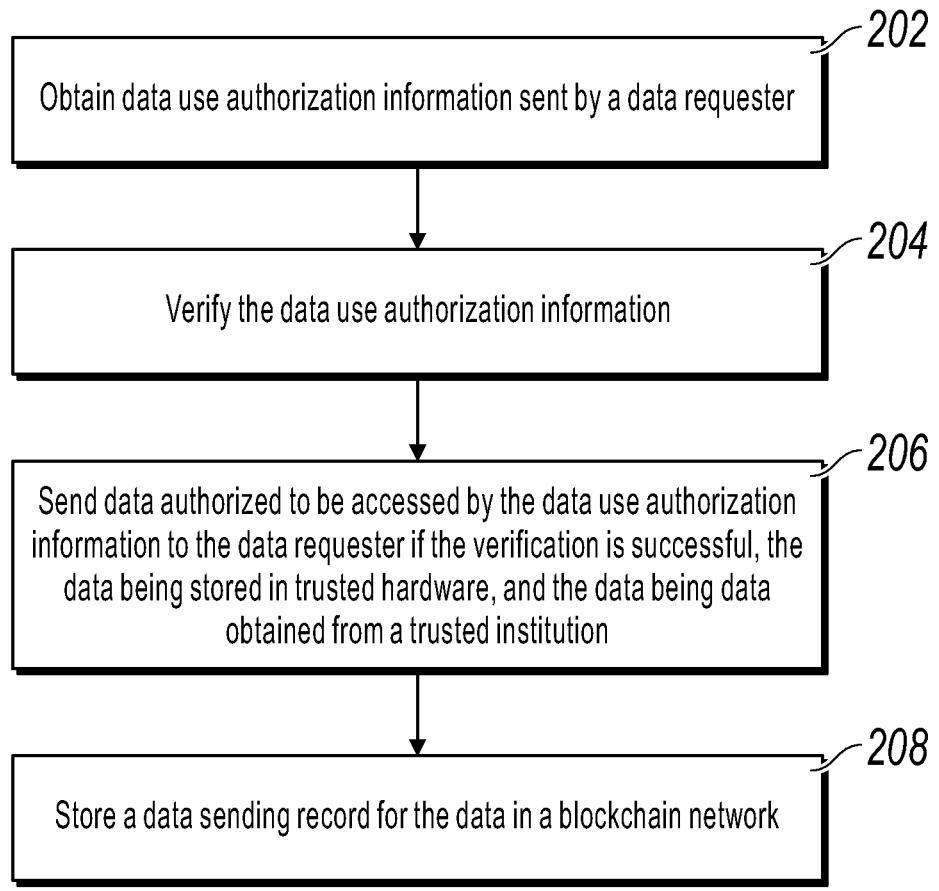
FIG. 2 is a schematic flowchart illustrating a data processing method, according to some embodiments of the present specification.

The following specifically describes in detail a data processing method provided in some embodiments of the present specification with reference to the accompanying drawings:

FIG. 2 is a schematic flowchart illustrating a data processing method, according to some embodiments of the present specification. From a program point of view, an execution body of the method flow can be an application client device for managing trusted data or an application server for managing trusted data.

As shown in FIG. 2, the method flow can include the following steps:

S202. Data use authorization information sent by a data requester is obtained.

In some embodiments of the present specification, a data owner can manage trusted data by using a target application carried on a personal end-user device. When the data owner needs to provide trusted data to the data requester, the data owner can generate data use authorization information for the trusted data by using a target application and send the data use authorization information to the data requester, thus the data requester requests for the trusted data from a client device of the target application or a server of the target application based on the received data use authorization information.

The data owner and the data requester can be either individuals or enterprises. For example, when an individual user needs to apply for a loan from a financial institution, the individual user needs to present trusted bank statement data to the financial institution so that the financial institution evaluates repayment ability of the individual user. At this time, the individual user can be the data owner and the financial institution can be the data requester. Or, when an individual user needs to perform service cooperation with an enterprise, the enterprise usually needs to present trusted enterprise certificate information to the individual user. At this time, the enterprise can serve as the data owner and the individual user can serve as the data requester.

In some embodiments of the present specification, the data use authorization information can include: registered account information of the data owner at a target application for managing trusted data, filtering condition information of data authorized to be used, communication port information of the target application, etc. Therefore, the client device or the server of the target application for managing the trusted data can determine data requested to be obtained by the data requester based on the received data use authorization information.

S204. The data use authorization information is verified.

In some embodiments of the present specification, the data use authorization information sent by the data requester should be generated by the data owner by using the target application for managing the trusted data, and therefore the data owner can verify the data use authorization information sent by the data requester based on pre-stored information of the data use authorization information once generated. If a verification result indicates that the data use authorization information sent by the data requester is the data use authorization information generated in advance by the data owner, it can be determined that the data use authorization information sent by the data requester is verified successfully. If a verification result indicates that the data use authorization information sent by the data requester is not actual use authorization information generated in advance by the data owner, the data requester can be considered to use false data use authorization information to spoof the data of the data owner. Therefore, it can be determined that the data use authorization information sent by the data requester is verified unsuccessfully.

S206. Data authorized to be accessed by the data use authorization information is sent to the data requester if the verification is successful, the data is stored in trusted hardware, and the data is data obtained from a trusted institution.

In some embodiments of the present specification, the data owner can store data obtained from a trusted institution in trusted hardware in advance through a target application for managing trusted data. The trusted institution can refer to an institution capable of providing data with high trustworthiness. For example, the trusted institution can include a bank, a tax bureau, an authoritative credit reporting institution, a service platform, etc. The bank can provide trusted salary statement data, the tax bureau can provide a trusted tax payment record, the authoritative credit reporting institution can provide a trusted credit report, the service platform can provide trusted transaction log data of a merchant, etc.

The trusted hardware is one of important foundations of trusted computation, a trusted execution environment (TEE) can be constructed in the trusted hardware to protect program code and data in trusted hardware from being disclosed and modified, thus the privacy and security of data in the trusted hardware can be protected. There are many types of trusted hardware, such as SGX of Intel, ARM TrustZone, and other trusted chips. In some embodiments of the present specification, a specific model of the trusted hardware is not specifically limited. The trusted hardware can further include an end-user device or server carrying a trusted chip, etc.

In some embodiments of the present specification, because the data stored in the trusted hardware is obtained from the trusted institution and the data in the trusted hardware cannot be tampered with, the high trustworthiness of data extracted from the trusted hardware can be ensured. After successfully verifying the data use authorization information sent by the data requester, the data owner sends highly trustable data in the trusted hardware to the data requester so that the data owner can conveniently implement management and control on use and authorization of the trusted data.

In some embodiments of the present specification, the data use authorization information can include: registered account information of the data owner at a target application, filtering condition information of data authorized to be used, etc. Therefore, after successfully verifying the data use authorization information, the target application can firstly determine a registered account of the data owner at the target application so that data satisfying the filtering condition and belonging to the registered account can be extracted from the trusted hardware, and the extracted data is fed back to the data requester. For example, the data use authorization information can include information such as user account ID: 123, and filtering condition: bank A, Jan. 1, 2020 to May 31, 2010, salary statement data. Therefore, the target application can extract salary statement data fed back by bank A from Jan. 1, 2020 to May 31, 2010 at an account with a user account ID of 123 based on the data use authorization information, and the extracted salary statement data is fed back to the data requester.

In some embodiments of the present specification, trusted data can be sent to a data requester in a plurality of ways. In addition to sending the data use authorization information to the target application, the data requester can further send data transmission way information specified by the data requester to the target application so as to enable the target application to feed back the trusted data to a device of the data requester by using a data transmission way specified by the data requester.

For example, data authorized to be accessed by the data use authorization information can be sent to the data requester through a blockchain network so as to prevent the data sent to the data requester from being tampered with. This data transmission way further helps improve the traceability of data transmission. Or, data authorized to be accessed by the data use authorization information is sent to the device of the data requester, etc. by technologies such as Bluetooth, WIFI, and the Internet. These data transmission ways do not need to upload data to be transmitted to the blockchain network so that leakage of the data to be transmitted can be alleviated, privacy of the data to be transmitted is ensured, and a data transmission process can be more convenient.

S208. A data sending record for the data is stored in a blockchain network.

In some embodiments of the present specification, a blockchain can be understood as a data chain formed by sequential storage of a plurality of blocks. A block header of each block includes a timestamp of the present block, a hash value of information of a previous block, and a hash value of information of the present block, thereby implementing mutual verification between blocks and forming a blockchain that cannot be tampered with. Each block can be understood as a data block (a data storage unit). As a decentralized database, the blockchain is a series of data blocks that are generated by mutual correlation based on a cryptography method. Each data block includes information of a network transaction used to verify the validity (anti-counterfeiting) of the information and to generate a next block. A chain formed by connecting blocks end to end is a blockchain. If data in the block needs to be modified, content of all blocks after the block need to be modified, and data backed up by all nodes in a blockchain network are modified. Therefore, the blockchain has characteristics of being difficult to be tampered with and deleted, and after data is stored in the blockchain, the blockchain is reliable as a method for maintaining content integrity.

In some embodiments of the present specification, a data sending record can be used to record data owner information, data requester information, filtering condition information of data sent to the data requester, data authorization approval process information, data sending time information, etc. After data requested by the data requester is sent to the data requester, a data sending record for the data is stored in the blockchain network so as to provide trusted data for subsequent authorized use condition analysis for the data of the data owner.

It should be understood that orders of some steps in the method described in one or more embodiments of the present specification can be interchanged based on an actual need, or some steps can be omitted or deleted.

According to the method in FIG. 2, after data use authorization information sent by a data requester is verified successfully, trusted data stored in trusted hardware and obtained from a trusted institution is sent to the data requester so that a data owner can conveniently provide data with high trustworthiness to the data requester, and the data owner can conveniently implement use authorization management and control of the trusted data. The solution can further store a data sending record for data of the data owner in a blockchain network so as to facilitate subsequent analysis on a data authorized use condition of the data owner.

Based on the method in FIG. 2, some embodiments of the present specification further provide some specific implementations of the method, which are described below.

In some embodiments of the present specification, before S202: data use authorization information sent by a data requester is obtained, the method can further include the following:

user service data sent by the trusted institution in response to a data request of a data owner is obtained; and the user service data is stored in the trusted hardware.

In some embodiments of the present specification, a trusted execution environment (TEE) is deployed in the trusted hardware, and the TEE is isolated from an operating system of the trusted hardware so that the operation that the user service data is stored in the trusted hardware can specifically include the following: the user service data is stored in the TEE in the trusted hardware.

In some embodiments of the present specification, a TEE can be a trusted execution environment that is a secure extension based on central processing unit (CPU) hardware and is completely isolated from the outside. At present, the industry pays great attention to TEE solutions, almost all mainstream chips and software alliances have their own TEE solutions, such as a trusted platform module (TPM) in software, and Intel software guard extensions (SGX), an ARM TrustZone and an AMD platform security processor (PSP) in hardware. The TEE can function as a hardware black box, code and data executed in the TEE cannot be snooped even at an operating system layer, and the TEE can only be operated through a pre-described interface in the code. In terms of efficiency, because black box property of the TEE, plaintext data is operated in the TEE instead of complex cryptography operation in homomorphic encryption, and there is almost no loss of efficiency in a calculation process. Therefore, the user service data of the user is obtained from the trusted institution through the program deployed in the TEE, and the obtained user service data piece is stored so that data privacy needs can be satisfied to a great extent on a premise of a relatively small performance loss. Moreover, trustworthiness of user service data stored in the TEE can be improved because programs and data in the TEE cannot be tampered with.

In some embodiments of the present specification, a data owner can use an existing data application way to apply for data at a trusted institution, and fill in contact information used by the data owner for managing a target application of trusted data so that the trusted institution can send the data requested by the data owner to the target application filled in by the data owner.

In some embodiments of the present specification, the data owner can use various types of target applications for managing trusted data. For example, the target application can be a mailbox application or a short message application, which is not specifically limited. Therefore, when a data owner requests for data from a trusted institution, the data owner can fill in a data application form at the trusted institution, and fill in a mailbox account or a short message receiving number registered by the data owner at a target application at a data receiving mode bar in the data application form, thus the data owner can receive the data sent by the trusted institution through the mailbox account or the short message receiving number at the target application of an individual, the target application can further store the data sent by the trusted institution in trusted hardware, and a corresponding relationship between the data sent by the trusted institution and the mailbox account or the short message receiving number of the data owner at the target application is established.

In some embodiments of the present specification, trusted hardware can be carried either at an end-user device of a data owner or at a target server communicably coupled to the end-user device. Storage positions for the data sent by the trusted institution can also be different based on different deployment positions of the trusted hardware.

Therefore, before the operation that the user service data is stored in the trusted hardware, the method can further include the following:

it is detected whether an end-user device of the data owner is provided with trusted hardware to obtain a detection result.

Correspondingly, the operation that the user service data is stored in the trusted hardware can specifically include the following:

the user service data is stored in trusted hardware having a use permission on a target server when the detection result indicates that the end-user device of the data owner is not provided with trusted hardware; and the user service data is stored in at least one of the trusted hardware on the end-user device and the trusted hardware having the use permission on the target server when the detection result indicates that the end-user device of the data owner is provided with trusted hardware.

In some embodiments of the present specification, a target application for managing trusted data is usually carried on an end-user device of a data owner, and therefore, whether trusted hardware is carried on the end-user device can be detected by using the target application. If the end-user device is not provided with trusted hardware, the data sent by the trusted institution needs to be stored at a server (i.e. target server) of a target application so as to store the data sent by the trusted institution by using the trusted hardware having the use permission on the target server. If the end-user device is provided with trusted hardware, the data owner can manually specify trusted hardware for storing the data sent by the trusted institution from the trusted hardware carried on the end-user device and the trusted hardware having the use permission on the target server. Or, if the end-user device is provided with trusted hardware, the data sent by the trusted institution can be stored not only at the trusted hardware carried on the end-user device, but also in the trusted hardware having the use permission on the target server, thereby preventing a data loss and improving data security.

In some embodiments of the present specification, the data in the trusted hardware cannot be tampered with, but can be deleted so that usability and a utilization rate of the trusted hardware are improved. Therefore, after the operation that the user service data is stored in the trusted hardware, the method can further include the following:

the user service data in the trusted hardware is deleted in response to a deletion instruction of the data owner for the user service data.

In some embodiments of the present specification, the data owner can write user service data into the trusted hardware through a target application for managing trusted data, and can further receive a deletion instruction of the data owner for the user service data through the target application and respond to the deletion instruction so as to delete the user service data in the trusted hardware on the end-user device and/or the trusted hardware having the use permission on the target server. Therefore, occupied storage space of the trusted hardware can be released to use the trusted hardware to store other data.

In some embodiments of the present specification, after the operation that the user service data is stored in the trusted hardware, the method can further include the following:

registered account information of the data owner at a target mailbox application is obtained; and the user service data is sent to a registered account indicated by the registered account information.

In some embodiments of the present specification, after a target application for managing trusted data obtains trusted data sent by the trusted institution, in addition to being stored in the trusted hardware, the trusted data sent by the trusted institution can further be forwarded to a registered account of the data owner at a target mailbox application so that the data owner can view the trusted data through the registered account at the target mailbox application.

In practice, when a target application for managing trusted data also belongs to a mailbox application, the target application and the target mailbox application are different mailbox applications. The data owner usually can directly use the target mailbox application to send data to other mailbox accounts so as to implement data transmission without performing operations of verifying use authorization information, etc., leading to a convenient and rapid operation. However, trustworthiness of data sent by the target mailbox application usually cannot be ensured.

In some embodiments of the present specification, the data use authorization information sent by the data requester can be generated by the data owner. Therefore, before S202: data use authorization information sent by a data requester is obtained, the method can further include the following:

a use authorization instruction of a data owner for target data is obtained, and the use authorization instruction is used to indicate that a specified data requester is allowed to obtain the target data stored in the trusted hardware; and target data use authorization information is generated in response to the use authorization instruction.

The operation that the data use authorization information is verified specifically includes the following:

the data use authorization information is compared with the target data use authorization information, and the verification is successful if the data use authorization information and the target data use authorization information are consistent.

In some embodiments of the present specification, when a data owner needs a data requester to obtain trusted target data, the data owner can generate use authorization information for the target data through a target application for managing trusted data. Therefore, when it is determined that the data use authorization information sent by the data requester is the use authorization information generated by the data owner, it is determined that the data use authorization information sent by the data requester is verified successfully. Details are omitted here for simplicity.

In some embodiments of the present specification, to ensure security and trustworthiness of a verification process and a verification result for the data use authorization information of the data requester, specifically, target data use authorization information can be generated, in response to the use authorization instruction, by using the trusted hardware. And the data use authorization information is compared with the target data use authorization information by using the trusted hardware.

In the present implementations, the target data use authorization information is generated by using the trusted hardware by the data owner, the generated target data use authorization information is stored in the trusted hardware, and the data use authorization information sent by the data requester is sent to the trusted hardware. As such, the data use authorization information sent by the data requester is compared with the target data use authorization information generated by the data owner in the trusted hardware. Therefore, the security and trustworthiness of the verification process and the verification result for the data use authorization information of the data requester can be improved.

In some embodiments of the present specification, to help the data requester to perform trustworthiness verification on the data sent by the data owner, the operation that data authorized to be accessed by the data use authorization information is sent to the data requester can specifically include the following: data authorized to be accessed by the data use authorization information and a data signature of the trusted institution for the data are sent to the data requester.

Therefore, the data requester can send the data signature for the data to the trusted institution for signature verification, if the signature verification is successful, the data sent by the data owner can be proved to be the data at the trusted institution, and the data is true and reliable.

In some embodiments of the present specification, after S208: a data sending record for the data is stored in a blockchain network, the method can further include the following:

a data sending record related to the data owner of the data is obtained from the blockchain network, and the data sending record related to the data owner of the data includes a data sending record of the data held by the data owner; and statistics is collected on the data sending record related to the data owner of the data to obtain a statistical result. The statistical result can reflect an amount of specified data of the data owner being transmitted, an acquisition count number and an acquisition frequency of the specified data by each data requester, etc. Therefore, a data use condition of the data owner can be conveniently analyzed.

Figure 3:
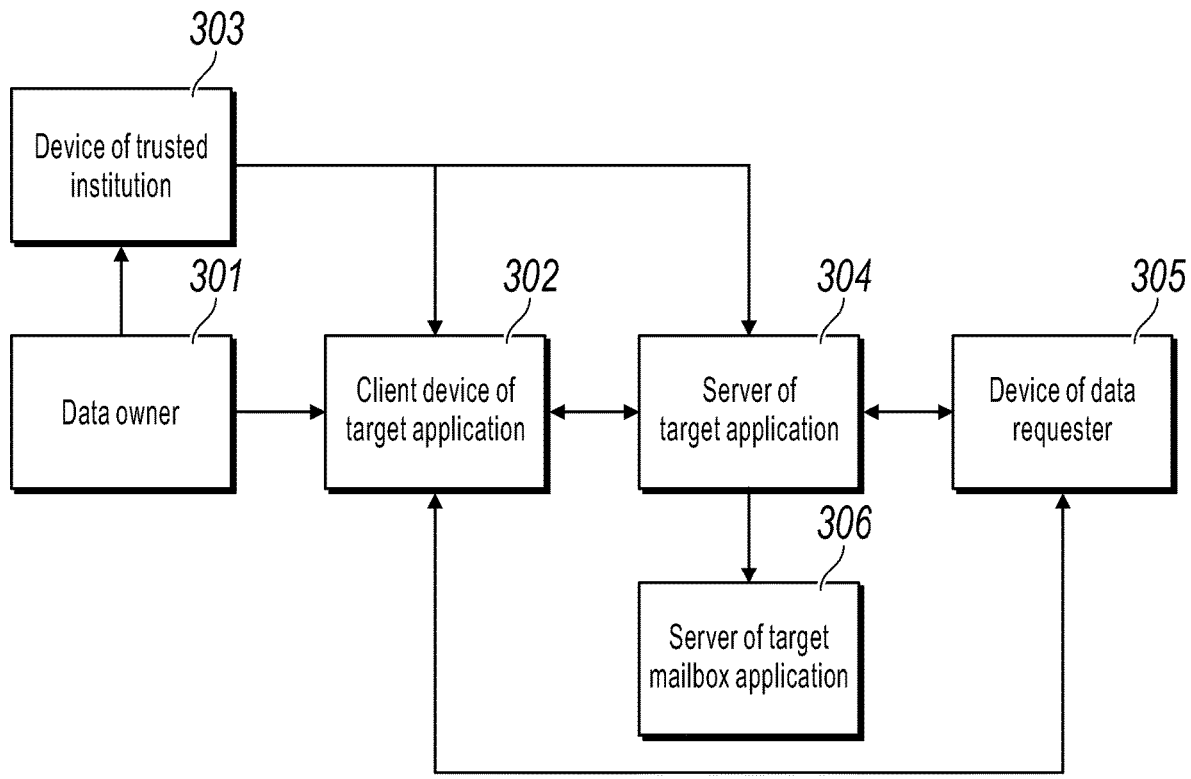
FIG. 3 is a schematic structural diagram illustrating a data processing system, according to some embodiments of the present specification.

FIG. 3 is a schematic structural diagram illustrating a data processing system, according to some embodiments of the present specification. The data processing system is configured to perform a data processing method provided in the embodiments of the present specification. As shown in FIG. 3, a data owner 301 can register an account at a target application at a client device 302 of the target application so that when the data owner 301 requests for data at a device 303 of a trusted institution in an existing data application way, account information of the account of the data owner 301 at the target application is filled in, the device 303 of the trusted institution can feed back the data requested by the data owner 301 to the client device 302 of the target application or a server 304 of the target application, and the data owner 301 stores the data sent by the trusted institution in trusted hardware through the account at the target application of an individual.

When the data owner 301 needs to present target data that is stored in the trusted hardware and comes from the trusted institution to the data requester, the data owner 301 can generate data use authorization information for the target data by using the client device 302 of the target application and send the data use authorization information to a device 305 of the data requester.

The data requester can send the data use authorization information to the client device 302 of the target application or the server 304 of the target application through the device 305 for verification, and if the verification is successful, the client device 302 of the target application or the server 304 of the target application can feed back the data requested to be used by the data use authorization information to the device 305 of the data requester.

In practice, the server 304 of the target application can further send the trusted data obtained from the device 303 of the trusted institution to the server 306 of a target mailbox application based on an instruction of the data owner 301, thus the data owner can use a mailbox account of the data owner 301 at the target mailbox application to store and forward the trusted data, thereby improving user experience.

The client device 302 of the target application or the server 304 of the target application can further store a data sending record for data of the data owner 301 in a blockchain network so as to facilitate subsequent analysis on a data authorized use condition of the data owner 301.

Figure 4:
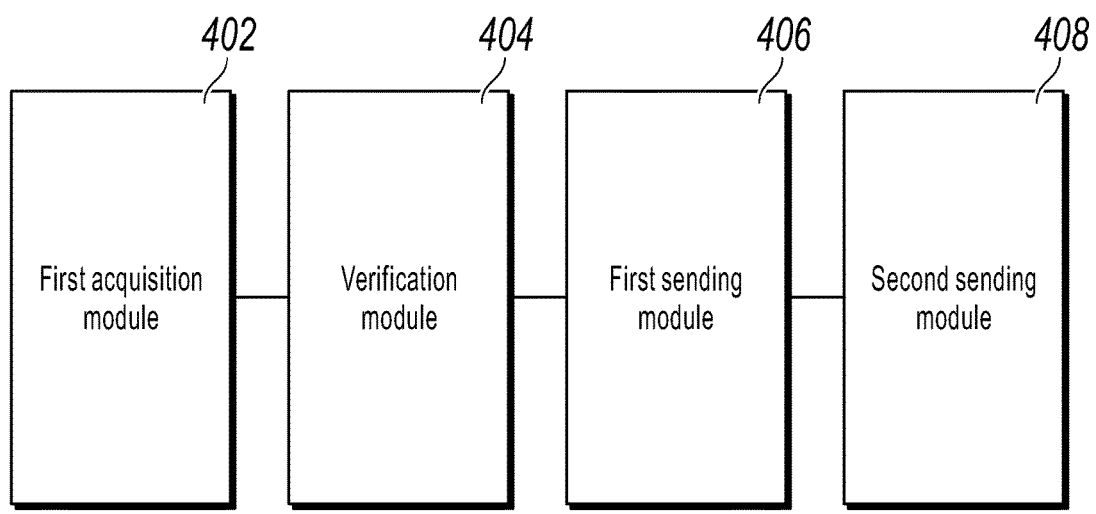
FIG. 4 is a schematic structural diagram illustrating a data processing apparatus corresponding to FIG. 2, according to some embodiments of the present specification.

Based on the same idea, some embodiments of the present specification further provide an apparatus corresponding to the previously described method. FIG. 4 is a schematic structural diagram illustrating a data processing apparatus corresponding to FIG. 2, according to some embodiments of the present specification. As shown in FIG. 4, the apparatus can include:

a first acquisition module 402, configured to obtain data use authorization information sent by a data requester;

a verification module 404, configured to verify the data use authorization information;

a first sending module 406, configured to send data authorized to be accessed by the data use authorization information to the data requester if the verification is successful, the data being stored in trusted hardware, and the data being data obtained from a trusted institution; and a second sending module 408, configured to store a data sending record for the data in a blockchain network.

Based on the apparatus in FIG. 4, some embodiments of the present specification further provide some specific implementations of the method, which are described below.

Optionally, the apparatus in FIG. 4 can further include:

a second acquisition module, configured to obtain a use authorization instruction of a data owner for target data, the use authorization instruction being used to indicate that a specified data requester is allowed to obtain the target data stored in the trusted hardware; and a use authorization information generation module, configured to generate target data use authorization information in response to the use authorization instruction.

The verification module 404 is specifically configured to compare the data use authorization information with the target data use authorization information, the verification being successful if the data use authorization information and the target data use authorization information are consistent.

Optionally, the use authorization information generation module can be specifically configured to:

generate, in response to the use authorization instruction, target data use authorization information by using the trusted hardware.

The verification module can be specifically configured to:

compare the data use authorization information with the target data use authorization information by using the trusted hardware.

Optionally, the apparatus in FIG. 4 can further include:

a third acquisition module, configured to obtain user service data sent by the trusted institution in response to a data request of a data owner; and a storage module, configured to store the user service data in the trusted hardware.

A TEE can be deployed in the trusted hardware, and the TEE is isolated from an operating system of the trusted hardware. The storage module can be specifically configured to store the user service data in the TEE in the trusted hardware.

Optionally, the apparatus in FIG. 4 can further include:

a fourth acquisition module, configured to obtain registered account information of the data owner at a target mailbox application; and a third sending module, configured to send the user service data to a registered account indicated by the registered account information.

Optionally, the apparatus in FIG. 4 can further include:

a detection module, configured to detect whether an end-user device of the data owner is provided with trusted hardware to obtain a detection result.

The storage module can be specifically configured to:

store the user service data in trusted hardware having a use permission on a target server when the detection result indicates that the end-user device of the data owner is not provided with trusted hardware; and store the user service data in at least one of the trusted hardware on the end-user device and the trusted hardware having the use permission on the target server when the detection result indicates that the end-user device of the data owner is provided with trusted hardware.

Optionally, the apparatus in FIG. 4 can further include:

a deletion module, configured to delete the user service data in the trusted hardware in response to a deletion instruction of the data owner for the user service data.

Optionally, the first sending module can be specifically configured to:

send data authorized to be accessed by the data use authorization information to the data requester through a blockchain network.

Optionally, the apparatus in FIG. 4 can further include:

a fifth acquisition module, configured to obtain a data sending record related to the data owner of the data from the blockchain network, the data sending record related to the data owner of the data including a data sending record of the data held by the data owner; and a statistics module, configured to perform statistics on the data sending record related to the data owner of the data to obtain a statistical result.

Based on the same idea, some embodiments of the present specification further provide a device corresponding to the previously described method.

Figure 5:
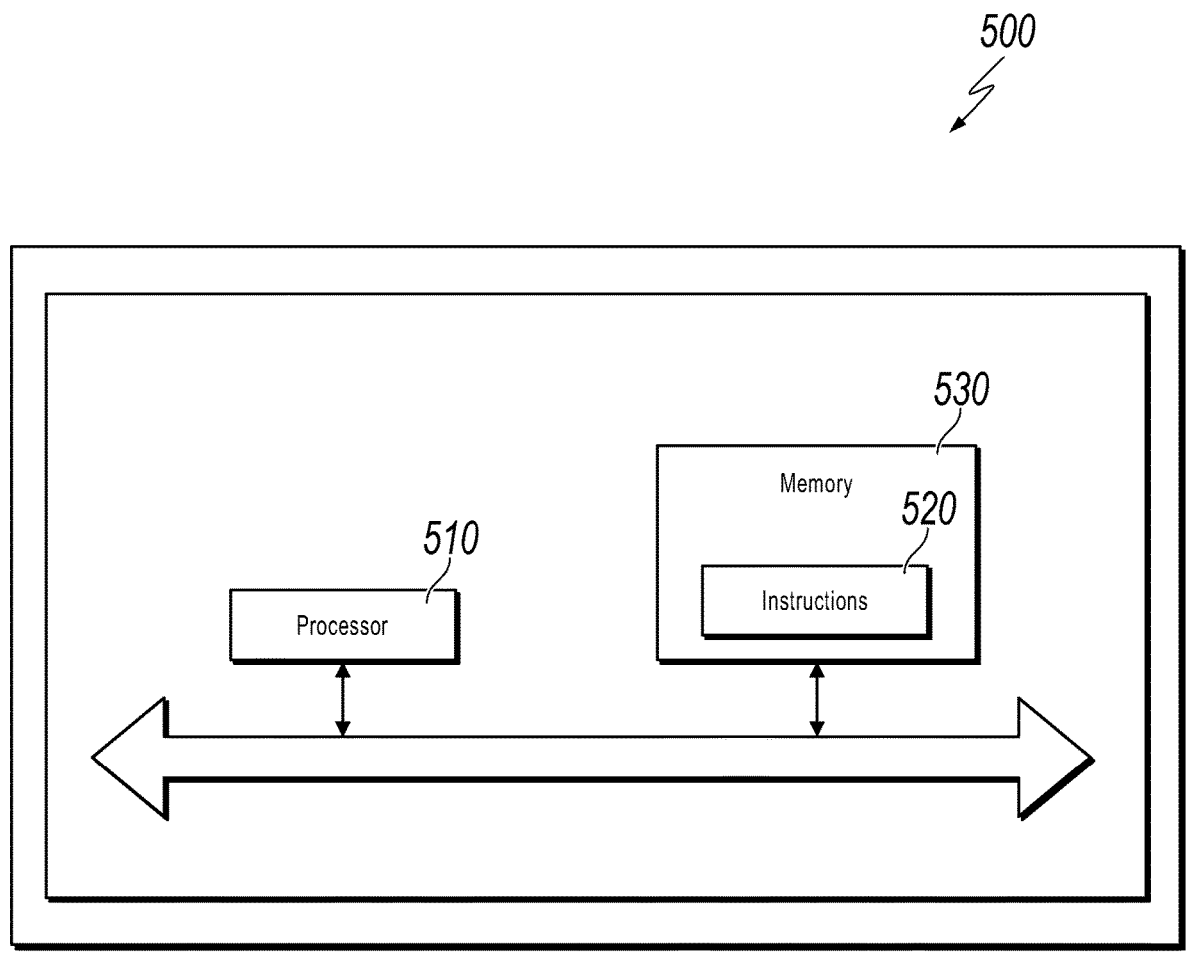
FIG. 5 is a schematic structural diagram illustrating a data processing device corresponding to FIG. 2, according to some embodiments of the present specification.

FIG. 5 is a schematic structural diagram illustrating a data processing device corresponding to FIG. 2, according to some embodiments of the present specification. As shown in FIG. 5, a device 500 can include:

at least one processor 510; and a memory 530 communicatively connected to the at least one processor, where the memory 530 stores instructions 520 executable by the at least one processor 510, and the instructions 520 are executed by the at least one processor 510 such that the at least one processor 510 can:

obtain data use authorization information sent by a data requester;

verify the data use authorization information;

send data authorized to be accessed by the data use authorization information to the data requester if the verification is successful, the data being stored in trusted hardware, and the data being data obtained from a trusted institution; and store a data sending record for the data in a blockchain network.

The embodiments in the present specification are described in a progressive way. For same or similar parts of the embodiments, mutual references can be made to the embodiments. Each embodiment focuses on a difference from other embodiments. In particular, the data processing device in FIG. 5 is basically similar to a method embodiment, and therefore is described briefly. For related parts, references can be made to some descriptions in the method embodiment.

In the 1990s, whether technology improvement is hardware improvement (for example, improvement of a circuit structure, such as a diode, a transistor, or a switch) or software improvement (improvement of a method procedure) can be clearly distinguished. However, with the development of technologies, current improvement for many method procedures can be considered as direct improvement of hardware circuit structures. A designer usually programs an improved method procedure to a hardware circuit to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are most commonly used at present. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also know that, in addition to implementing a controller by using computer-readable program code, the method steps can be logically programmed so that the controller implements the same functions in the form of a logic gate, a switch, an application-specific integrated circuit, a programmable logic controller, an embedded microcontroller, etc. Therefore, the controller can be regarded as a hardware component, and an apparatus included therein for implementing various functions can also be regarded as the structure within the hardware component. Or even, the apparatus for implementing various functions can e regarded as both a software module for implementing a method and the structure within the hardware component.

The system, apparatus, module, or unit illustrated in the previously described embodiments can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smart phone, a personal digital assistant, a media player, a navigation device, an email receiving and transmitting device, a game console, a tablet computer, a wearable device, or any combination thereof.

For ease of description, the above apparatus is divided into various units based on functions for separate description. Certainly, during implementation of the present application, the functions of the modules can be implemented in the same or more pieces of software and/or hardware.

A person skilled in the art should understand that the embodiments of the present invention can be provided as methods, systems, or computer program products. Therefore, the present invention can take a form of complete hardware embodiments, complete software embodiments, or embodiments combining software and hardware. Further, the present invention can take a form of a computer program product implemented on one or more computer-usable storage media (including but not limited to disk storage, CD-ROM, and optical storage) containing computer-usable program code.

The present invention is described with reference to flowcharts and/or block diagrams of methods, devices (systems), and computer program products according to the embodiments of the present invention. It should be understood that each method flow and/or block in the flowcharts and/or block diagrams and combinations of flows and/or blocks in the flowcharts and/or block diagrams can be implemented by using computer program instructions. These computer program instructions can be provided to a processor of a general-purpose computer, a special-purpose computer, an embedded processor, or another programmable data processing device to produce a machine, so that the instructions executed by the processor of the computer or another programmable data processing device produce a device for implementing functions specified in one or more flows in the flowcharts and/or one or more blocks in the block diagrams.

These computer program instructions can also be stored in a computer-readable memory that can direct a computer or another programmable data processing device to operate in a specific way, so that the instructions stored in the computer-readable memory produce a product of manufacture including an instruction device, and the instruction device implements functions specified in one or more flows in the flowcharts and/or one or more blocks in the block diagrams.

These computer program instructions can alternatively be loaded onto a computer or another programmable data processing device, such that a series of operation steps are performed on the computer or the another programmable data processing device to produce a computer-implemented process. Therefore, the instructions executed on the computer or the another programmable device provide steps for implementing a specific function in one or more flows in the flowcharts and/or in one or more blocks in the block diagrams.

In a typical configuration, a calculating device includes one or more processors (CPUs), an input/output interface, a network interface, and a memory.

The memory may include a non-persistent memory, a random access memory (RAM), and/or a non-volatile memory in a computer readable medium, such as a read-only memory (ROM) or a flash RAM. The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a ROM, an electrically erasable programmable ROM (EEPROM), a flash memory or another memory technology, a compact disc ROM (CD-ROM), a digital versatile disc (DVD), or another optical storage, a cassette, a magnetic disk storage, or another magnetic storage device or any other non-transmission medium. The computer storage medium can be configured to store information that can be accessed by a computing device. Based on the definition in the present specification, the computer-readable medium does not include transitory media such as a modulated data signal and carrier.

It is also worthwhile to note that the terms "include", "comprise" or any other variants thereof are intended to cover non-exclusive inclusion, so that processes, methods, products, or devices that include a series of elements include not only those elements but also other elements that are not explicitly listed, or elements inherent in such processes, methods, products, or devices. An element preceded by "includes a . . . " does not, without more constraints, preclude the presence of additional identical elements in the process, method, product, or device that includes the element.

A person skilled in the art should understand that the embodiments of the present application can be provided as a method, a system, or a computer program product. Therefore, the present application can use a form of hardware only embodiments, software only embodiments, or embodiments with a combination of software and hardware. Moreover, the present application can use a form of a computer program product that is implemented on one or more computer-usable storage media (including but not limited to a magnetic disk memory, a CD-ROM, an optical memory, etc.) that include computer-usable program code.

The present application can be described in common contexts of computer-executable instructions executed by a computer, such as a program module. Generally, the program module includes a routine, program, object, component, data structure, etc. for executing a particular task or implementing a particular abstract data type. Alternatively, the present application can be practiced in distributed computing environments. In these distributed computing environments, tasks are executed by remote processing devices that are connected by using a communications network. In the distributed computing environments, the program modules can be located in both local and remote computer storage media including storage devices.

The previous descriptions are merely embodiments of the present application, and are not intended to limit the present application. For a person skilled in the art, the present application can be subject to various modifications and variations. Any modifications, equivalent replacements, improvements, etc. that are made within the spirit and principles of the present application shall all be included within the scope of the claims of the present application.

What is claimed is:

1. A data processing method, comprising:
obtaining user service data sent by a trusted institution in response to a target data request received from a target data owner;
detecting whether an end-user device of the target data owner is provided with trusted hardware;
in response to detecting that the end-user device of the target data owner is not provided with the trusted hardware, storing the user service data in trusted hardware having a use permission on a target server;
in response to detecting that the end-user device of the target data owner is provided with the trusted hardware, storing the user service data in the trusted hardware on the end-user device and the trusted hardware having the use permission on the target server;
obtaining data use authorization information sent by a data requester;
verifying the data use authorization information;
in response to successfully verifying the data use authorization information, sending target data authorized to be accessed by the data use authorization information from the trusted hardware associated with the target data owner of the target data to (i) the data requester based upon data transmission way information specified by the data requester and (ii) a mailbox account associated with the target data owner, wherein the target data authorized to be accessed is obtained from the trusted institution and is stored in the trusted hardware; and
storing, on a blockchain associated with a blockchain network, a data sending record for the target data.

2. The method according to claim 1, comprising:
obtaining, prior to obtaining data use authorization information, a use authorization instruction of the target data owner, wherein the use authorization instruction indicates that the data requester is allowed to obtain the target data stored in the trusted hardware; and
generating target data use authorization information in response to the use authorization instruction.

3. The method according to claim 2, wherein verifying the data use authorization information comprises:
comparing the data use authorization information with the target data use authorization information; and
determining that the data use authorization information and the target data use authorization information are consistent.

4. The method according to claim 3, wherein generating target data use authorization information comprises:
generating, in response to the use authorization instruction, the target data use authorization information by using the trusted hardware,
wherein comparing the data use authorization information with the target data use authorization information comprises:
comparing the data use authorization information with the target data use authorization information by using the trusted hardware.

5. The method according to claim 1, further comprising:
obtaining, after storing the user service data, registered account information of the mailbox account associated with the target data owner at a target mailbox application; and
sending the user service data to a registered account indicated by the registered account information.

6. The method according to claim 1, comprising:
deleting, after storing the user service data, the user service data in the trusted hardware in response to a deletion instruction of the target data owner of the user service data.

7. The method according to claim 1,
wherein a trusted execution environment (TEE) is deployed in the trusted hardware, and the TEE is isolated from an operating system of the trusted hardware; and wherein storing the user service data in the trusted hardware comprises:
storing the user service data in the TEE in the trusted hardware.

8. The method according to claim 1, wherein sending target data authorized to be accessed by the data use authorization information to the data requester comprises:
sending target data authorized to be accessed by the data use authorization information to the data requester through the blockchain network.

9. The method according to claim 8, wherein sending target data authorized to be accessed by the data use authorization information to the data requester through the blockchain network comprises:
sending, to the data requester, a data signature of the trusted institution for the target data.

10. The method according to claim 1, comprising:
obtaining, after the storing a data sending record for the target data, a data sending record held by the target data owner from the blockchain network; and
performing statistical analysis on the data sending record held by the target data owner to obtain a statistical result.

11. A non-transitory, computer-readable medium storing one or more instructions executable by a computer system to perform operations comprising:
obtaining user service data sent by a trusted institution in response to a target data request received from a target data owner;
detecting whether an end-user device of the target data owner is provided with trusted hardware;
in response to detecting that the end-user device of the target data owner is not provided with the trusted hardware, storing the user service data in trusted hardware having a use permission on a target server;
in response to detecting that the end-user device of the target data owner is provided with the trusted hardware, storing the user service data in the trusted hardware on the end-user device and the trusted hardware having the use permission on the target server;
obtaining data use authorization information sent by a data requester;
verifying the data use authorization information;
in response to successfully verifying the data use authorization information, sending target data authorized to be accessed by the data use authorization information from the trusted hardware associated with the target data owner of the target data to (i) the data requester based upon data transmission way information specified by the data requester and (ii) a mailbox account associated with the target data owner, wherein the target data authorized to be accessed is obtained from the trusted institution and is stored in the trusted hardware; and
storing, on a blockchain associated with a blockchain network, a data sending record for the target data.

12. The non-transitory, computer-readable medium according to claim 11, including operations comprising:
obtaining, prior to obtaining data use authorization information, a use authorization instruction of the target data owner, wherein the use authorization instruction indicates that the data requester is allowed to obtain the target data stored in the trusted hardware; and
generating target data use authorization information in response to the use authorization instruction.

13. The non-transitory, computer-readable medium according to claim 12, wherein verifying the data use authorization information includes operations comprising:
comparing the data use authorization information with the target data use authorization information; and
determining that the data use authorization information and the target data use authorization information are consistent.

14. The non-transitory, computer-readable medium according to claim 13, wherein generating target data use authorization information includes operations comprising:
generating, in response to the use authorization instruction, the target data use authorization information by using the trusted hardware,
wherein comparing the data use authorization information with the target data use authorization information comprises:
comparing the data use authorization information with the target data use authorization information by using the trusted hardware.

15. The non-transitory, computer-readable medium according to claim 11, including operations comprising:
obtaining, after storing the user service data, registered account information of the mailbox account associated with the target data owner at a target mailbox application; and
sending the user service data to a registered account indicated by the registered account information.

16. The non-transitory, computer-readable medium according to claim 11, including operations comprising:
obtaining, after storing the user service data, registered account information of the mailbox account associated with the target data owner at a target mailbox application; and
sending the user service data to a registered account indicated by the registered account information.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining user service data sent by a trusted institution in response to a target data request received from a target data owner;
detecting whether an end-user device of the target data owner is provided with trusted hardware;
in response to detecting that the end-user device of the target data owner is not provided with the trusted hardware, storing the user service data in trusted hardware having a use permission on a target server;
in response to detecting that the end-user device of the target data owner is provided with the trusted hardware, storing the user service data in the trusted hardware on the end-user device and the trusted hardware having the use permission on the target server;
obtaining data use authorization information sent by a data requester;
verifying the data use authorization information;
in response to successfully verifying the data use authorization information, sending target data authorized to be accessed by the data use authorization information from the trusted hardware associated with the target data owner of the target data to (i) the data requester based upon data transmission way information specified by the data requester and (ii) a mailbox account associated with the target data owner, wherein the target data authorized to be accessed is obtained from the trusted institution and is stored in the trusted hardware; and storing, on a blockchain associated with a blockchain network, a data sending record for the target data.

18. The computer-implemented system of claim 17, including operations comprising:

obtaining, prior to obtaining data use authorization information, a use authorization instruction of the target data owner, wherein the use authorization instruction indicates that the data requester is allowed to obtain the target data stored in the trusted hardware; and generating target data use authorization information in response to the use authorization instruction.

19. The computer-implemented system of claim 17, including operations comprising:

obtaining, after storing the user service data, registered account information of the mailbox account associated with the target data owner at a target mailbox application; and sending the user service data to a registered account indicated by the registered account information.

* * * * *